No. 639,993. Patented Dec. 26, 1899.
M. F. JURUICK.
PHOTOGRAPHIC SHUTTER.
(Application filed Nov. 23, 1898.)
(Model.)
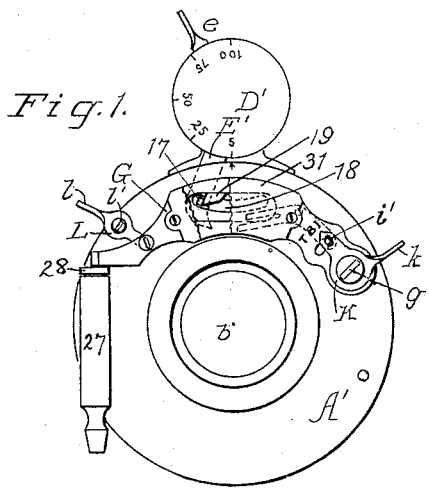
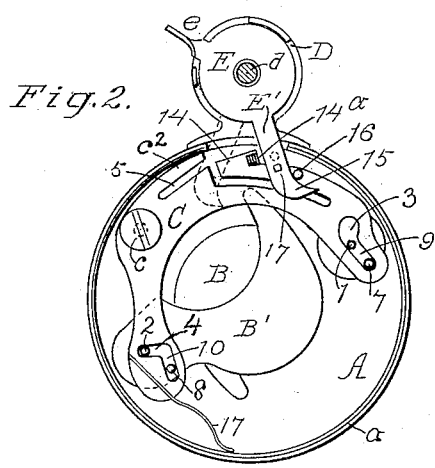
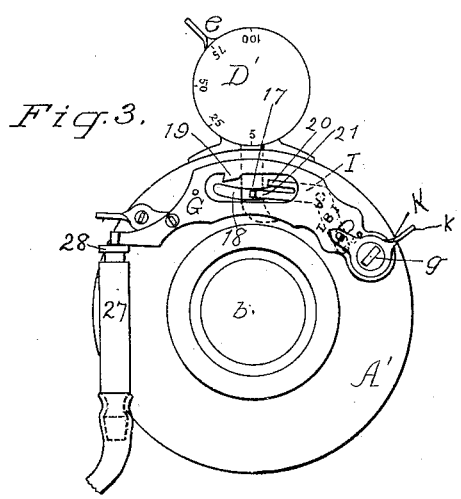
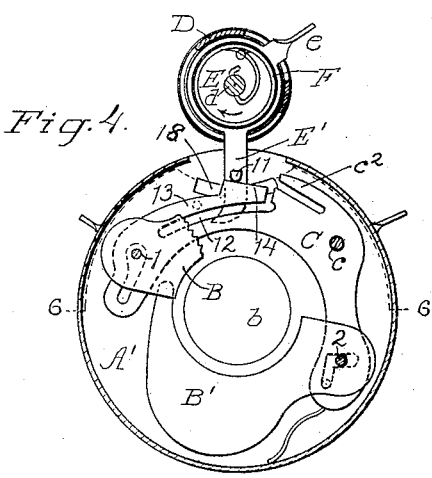
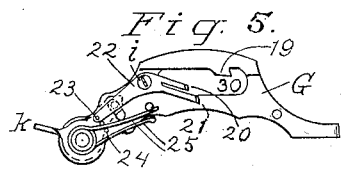
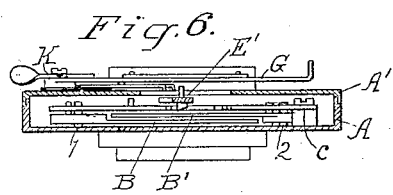
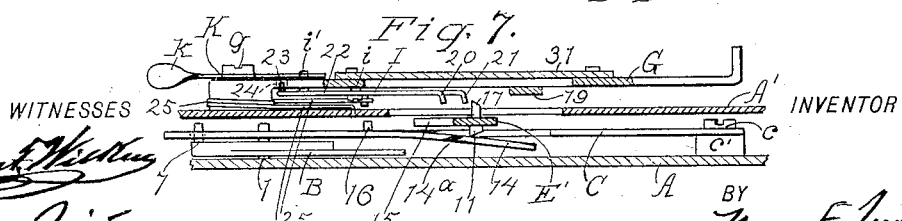
WITNESSES
INVENTOR
BY

UNITED STATES PATENT OFFICE.

MAXIMILLIAN F. JURUICK, OF CRESSKILL, NEW JERSEY.

PHOTOGRAPHIC SHUTTER.

SPECIFICATION forming part of Letters Patent No. 639,993, dated December 26, 1899.

Application filed November 23, 1898. Serial No. 697,259. (Model.)

*To all whom it may concern:*

Be it known that I, MAXIMILLIAN F. JU-RUICK, a citizen of the United States, residing at Cresskill, county of Bergen, State of New Jersey, have invented certain new and useful Improvements in Camera-Shutters, of which the following is a specification.

This invention relates to improvements in camera-shutters; and its object is to provide a shutter-operating mechanism of simple and efficient construction.

My invention has especial reference to the form of shutter mechanism wherein the actuating member in its movement in one direction performs all the operations of opening and closing the shutter, while in returning or resetting said actuating member it is without action on the shutter; and my invention comprises means for rendering the engagement between the actuating member and the shutter mechanism effective or non-effective according to the direction of movement of the former.

Other features of my invention relate to the construction of the shutter mechanism, whereby the assembling and adjustment of same are facilitated and to the construction of the release and stop mechanism for the actuating member.

Referring to the accompanying drawings, which form a part of this specification, Figure 1 is a partly-broken front view of my improved shutter. Fig. 2 is a front view of the same with the front portion of the casing removed, the operating-spring box being shown in section. Fig. 3 is a view similar to Fig. 1, with the cover-plate of the release-lever removed and the operating member in its middle or shutter opening position. Fig. 4 is a sectional view looking from the rear of the shutter mechanism in the same position as in Fig. 3. Fig. 5 is a detail rear view of the release and stop lever. Fig. 6 is a sectional view of the shutter mechanism, taken on the irregular line 6 6 in Fig. 4; and Fig. 7 is an enlarged horizontal section of the shutter mechanism, actuating member, and release and stop mechanism, showing the operating member as being reset without actuating the shutter mechanism.

The shutter-casing is preferably composed of a rear plate A and a front plate A', attached together by screws or otherwise and provided with the usual lens attachments, forming the aperture *b*.

In the rear casing or back plate A are pivoted the shutters B B', which are preferably supported on the back plate A by means of headless pins or studs 1 2, projecting from said plate, passing freely through the pivot-holes of said shutters and the shutters being held in place on said pins by the operating-lever C, which is pivoted by pivot-screw *c* to a stud *c'* on the back plate A and extends over and in contact with the shutters. The use of special fastening-screws for the shutter is thus avoided, and when the lever C has been removed the shutters can at once be lifted off.

The lever C has slots 3 4, which are traversed by the fixed pins 1 2 as the lever swings on its pivot, and extensions 9 10 of these slots engage with pins 7 8 on the shutters B B', so as to cause the shutters to turn to open or closed position as the lever C swings one way or the other. A slit 5 is formed in lever C, so as to leave a projecting stop-finger $c^2$ above said slit, such finger engaging with the rim *a* of back plate A, and thus acting as a stop for lever C.

Fastened to top of back plate A is a box D, which contains and supports the actuating member or setting-lever E, which is pivoted therein at *d* and is provided with a handle *e*. An actuating-spring F is secured at one end to the member E and at the other end to pivotal stud *d* of cap D', which is adjustable in the usual manner to adjust the tension of the spring. An arm E' of member E extends down into the shutter-casing and is provided with a projection, pin, or stud 11, which engages with the lever C to operate the same. The lever C has a longitudinal slot 12 formed therein, so as to leave a finger or arm 13 above said slit and on the upper side of the lever, and on the end of this finger is an inclined or cam portion 14, which is adapted to engage with pin 11 on arm E' as the latter passes in the direction of the arrow in Fig. 4 and, being inclined to the path of pin 11, to thereby cause the lever C to be depressed and to open the shutters B B'. The end 15 of arm E' is adapted to engage with a pin 16 on lever C just after pin 11 leaves incline 14, and to thereby force the lever C back to its normal position, thus closing the shutters by the power of the actuating-spring itself. The same actuating-spring thus successively acts to open and to close the shutters. To further this object, the end 15 of arm E' is preferably curved or inclined as shown. I also provide spring S, attached to lever C and engaging with the rim $a$ of casing A, to impel the said lever to the shutter-closing position; but this spring need not be of greater strength than is necessary to hold the shutters closed when the actuating member is set or is being reset for action. In its return movement in resetting the pin 17 on arm E' strikes the rear edge or shoulder 14$^a$ of the cam portion 14 of finger 13, which is capable of resilient transverse movement or is elastically flexible in a direction transverse to the motion of lever C and to the plane of said lever, and said pin 11 and rear edge of shoulder 14$^a$ of said cam portion are so beveled or inclined that the pin 17 thereupon bends the finger 13 to one side, as shown in Fig. 7, so as to allow said pin 11 to pass without depression of lever C or opening of the shutters.

The lever C is preferably made of brass or similar malleable material, so that the amount to which the said lever is depressed, and thus the degree of opening of the shutters B B', may be determined or adjusted by bending the finger 13 inwardly or outwardly, as required, this finger 13 being thus adjustable in the direction of movement of the lever C. This may be effected by inserting a screwdriver between finger 13 and the casing or in the slit 12, as the case may be, and then prying the finger into the desired position. In similar manner the stop $c'$ may be adjusted to limit or extend the closing movement of the shutters B B' by inserting a screw-driver in slit 5 or between said finger and rim $a$, as the case may be, and prying the said stop-finger into proper position.

On the front side of arm E' is a stud or detent 17, and a release and stop lever G, pivoted at $g$ to the front side of front plate A, and is provided with detents which extend through a slot 18 in the front plate A'' and engage with the detent 17 to control the release and stopping of lever C. One of these detents is in the form of a lug or projection 19 on the lever G itself and engages with the detent 17 to hold the arm E' in the reset position. (Shown in Fig. 1.) The other detents are on an auxiliary lever I, pivoted at $i$ to lever G and having detent-fingers 20 21 formed thereon, and the other arm 22 of said lever I carries a pin 23, (see Figs. 5 and 7,) which is snapped by the spring action of arm 22 into one or the other of the holes 24 in lever G, thus holding the arm $g$, the auxiliary stop-lever I, and the release-lever G in the different relative positions to which they may be shifted and preventing accidental displacement.

K is a lever which has a handle $k$ and is pivoted at $g$ to the front plate A' and engages by a slot with a pin $i'$ on the lever I, so as to shift said lever to bring either of the detents 20 21 into the path of detent 17. A lever L, having handle $l$, is pivoted to the front plate at $l'$ and engages by a pivotal connection with the lever G, so as to enable operation of said lever G by pressure on handle $l$. The lever G is returned to normal position by spring 25. A pneumatic operating device for lever G is shown consisting of the usual pneumatic cylinder 27, whose piston 28 engages with the end of lever G to ram same when air-pressure is applied in such cylinder.

In order to enable easy access to and observation of the detent mechanism, the lever G may have an oblong slot 30, which is covered by a cover-plate 31, fastened removably thereto by screws. The lever G is also provided with marks, as indicated, corresponding to the desired kind of exposure, as indicated by the pointed end of said lever registering with the marks "I," "B," or "T," corresponding to instantaneous, bulb-instantaneous, and time exposures. The actuating member or setting-lever is reset by moving the handle $e$ to throw the arm E' to position shown in Fig. 1, where it is caught and held by detent 19, engaging with detent 17, as shown in Fig. 1. In this figure the lever K is shown as placed in the instantaneous position, so that when the release-lever G is raised by the lever L or the pneumatic device 27 28 it does not bring either detent 20 or 21 into the path of detent 17, and the arm E', released from detent 19, is turned by the actuating-spring F so that its pin 17 rides over the cam portion 14 of finger 13 on lever C, thus depressing said lever and opening the shutter, and then the said pin passing off of said cam portion frees the lever C again, and the end 15 of arm E' then striking the pin 16 on said lever C throws that lever forcibly upward and closes the shutter, as indicated in Fig. 2. In resetting the actuating member or setting-lever the pin 11 rides over the beveled edge 14$^a$ at the rear side of cam portion 14, and thus deflects the arm or finger 13 laterally without depressing same or affecting the main body of lever C or the shutters B B', which are meanwhile held stationary by spring 17.

If the lever K be placed in the middle on "B" position the upper detent 20 is brought into the path of detent 17 when lever G is raised, so that the arm E' is arrested midway of its course and the lever C is therefore held depressed, holding the shutters B B' open until lever G is released, whereupon the arm E' is freed and allowed to complete its movement and close the shutters.

In Fig. 3 the lever K is shown as placed in "time" position, so that when the lever G is raised the lower detent 21 arrests the detent 17 and arm E', as shown, and thus holds the lever C depressed, as shown in Fig. 4. Then when lever G is released the lower detent 21 drops away from detent 17, but detent 20 is at the same time brought down into its path, so that the arm E' is only permitted to move a slight distance and the shutters remain open. To terminate the exposure, the lever G is raised again, whereupon the detent 20 rises out of the way of detent 17 and the arm E' is allowed to proceed and cause the shutters to close.

Having thus described my invention, the following is what I claim as new therein and desire to secure by Letters Patent:

1. In a camera-shutter mechanism, the combination of a shutter-operating lever having a finger supported so as to move therewith, but which is elastically flexible in a direction transverse to the plane of motion of the operating-lever, and an actuating-lever engaging with the said finger to move it bodily with the shutter-operating lever, or transversely to the said lever, according to the movement of the said actuating-lever.

2. In a camera-shutter mechanism, the combination with the actuating device, of a shutter-operating lever having a finger movable therewith but resiliently flexible transversely thereto, and having an upper edge portion inclined to the path of the actuating device so as to cause the finger and shutter-operating lever to be depressed by movement of the actuating device in one direction, and said finger having a shoulder in the rear of said inclined upper edge portion with which the actuating device engages in its movement in the other direction to cause lateral movement of the finger without moving the shutter-operating lever.

3. In a camera-shutter mechanism, the combination with the actuating-lever carrying an actuating-pin with an inclined end, of a shutter-operating lever having a finger attached thereto and movable therewith but resiliently flexible transversely thereto, said finger having an upper edge portion inclined to the path of the actuating-pin and engaged thereby in one direction of movement of the pin to cause depression of the finger and shutter-operating lever, and said finger having a shoulder in the rear of said inclined upper edge portion, with which the inclined end of the actuating-pin engages to cause lateral movement of the finger without moving the shutter-operating lever.

4. In a camera-shutter mechanism, the combination with the actuating-lever carrying an actuating-pin, of a shutter-operating lever having a finger attached thereto and movable therewith, but resiliently flexible transversely thereto, said finger having an edge portion to engage with the actuating-pin in its movement in one direction to cause depression of the finger and the shutter-operating lever, and said finger having a laterally-inclined shoulder in the rear of said edge portion to engage with the actuating-pin in its reverse movement to cause lateral movement of the finger without actuating the shutter-operating lever.

5. In a camera-shutter mechanism, the combination with the freely-movable shutter, of a lever moving said shutter positively in opposite directions, and an actuating device which imparts movement positively in opposite direction by a continued movement of the actuating device in one direction.

6. In a camera-shutter mechanism, the combination with the shutter, of a shutter-operating lever, an actuating-spring and an actuating-lever connected to the actuating-spring and in its movement under the action of said spring engaging with the shutter-operating lever to move same successively in reverse directions by the direct action of said spring to open and close the shutter.

7. In a camera-shutter, the combination with the actuating-lever and its actuating-spring, of a shutter-operating lever having a spring tending to hold it in shutter-closing position, and provided with a cam portion engaging with the actuating-lever to cause depression and subsequent release of the shutter-operating lever, and means on the said shutter-operating lever, for engaging with the actuating-lever subsequent to such release to enable the actuating-spring, through the actuating-lever, to force the shutter-operating lever to closed position.

8. In a camera-shutter mechanism, the combination with the shutter-operating lever having a cam part and a pin, of an actuating-spring and an actuating-lever connected thereto and having an actuating-pin engaging with the cam part of the shutter-operating lever to move the latter to shutter-opening position, and said actuating-lever having a portion engaging with the pin on the shutter-operating lever to move same to shutter-closing position, after the actuating-pin passes out of contact with the aforesaid cam part.

9. In a camera-shutter mechanism, the combination with the shutters and the shutter-operating mechanism, and a casing containing same and having a slot, of a release-lever located outside of and in front of the casing, and an auxiliary stop-lever pivoted to said release-lever and also located outside of said casing, the release and stop detents on said levers projecting through the slot in said casing, and an actuating-lever supported on said casing and having an arm extending within said casing and engaging with the shutter mechanism, and having a part extending through said slot and engaging with said release and stop lever.

10. In a camera-shutter mechanism, the combination of a casing having a slot, a shutter-operating mechanism located within said casing and having an actuating part, a release-lever pivoted in the outside of said casing, an auxiliary stop-lever pivoted to said release-lever and also located outside and in front of the casing and engaging with said actuating part of the shutter-operating mechanism, and a shifting lever also pivoted outside of the casing and connected to the auxiliary stop-lever to adjust its position.

11. In a camera-shutter, the combination with the release-lever, of an auxiliary stop-lever pivoted thereto and having a plurality of stops of a shifting lever pivoted concentrically with the release-lever and connected with the auxiliary stop-lever, and means on said shifting lever and said release-lever for indicating their relative adjustment.

12. In a camera-shutter, the combination with the release-lever, of an auxiliary stop-lever pivoted thereto and having a plurality of stops, a shifting lever pivoted concentrically with the release-lever and connected with the auxiliary stop-lever, and means for holding the said auxiliary lever and release-lever in different relative positions.

MAX. F. JURUICK.

Witnesses:
 CHAS. F. WILKINS,
 H. N. REID.